E. OWEN.
CANE CUTTER.

No. 4,551.  Patented May 30, 1846.

UNITED STATES PATENT OFFICE.

EDWIN OWEN, OF BYRON, INDIANA.

IMPROVEMENT IN CANE-CUTTERS.

Specification forming part of Letters Patent No. 4,551, dated May 30, 1846.

*To all whom it may concern:*

Be it known that I, EDWIN OWEN, of Byron, in the county of La Porte and State of Indiana, have invented a new and useful Improvement in Machines for Cutting Corn and Brush, &c.; and I do hereby declare that the following is a full, clear, and exact description of my invention, reference being had to the drawings herewith connected, in which—

Figure 1:
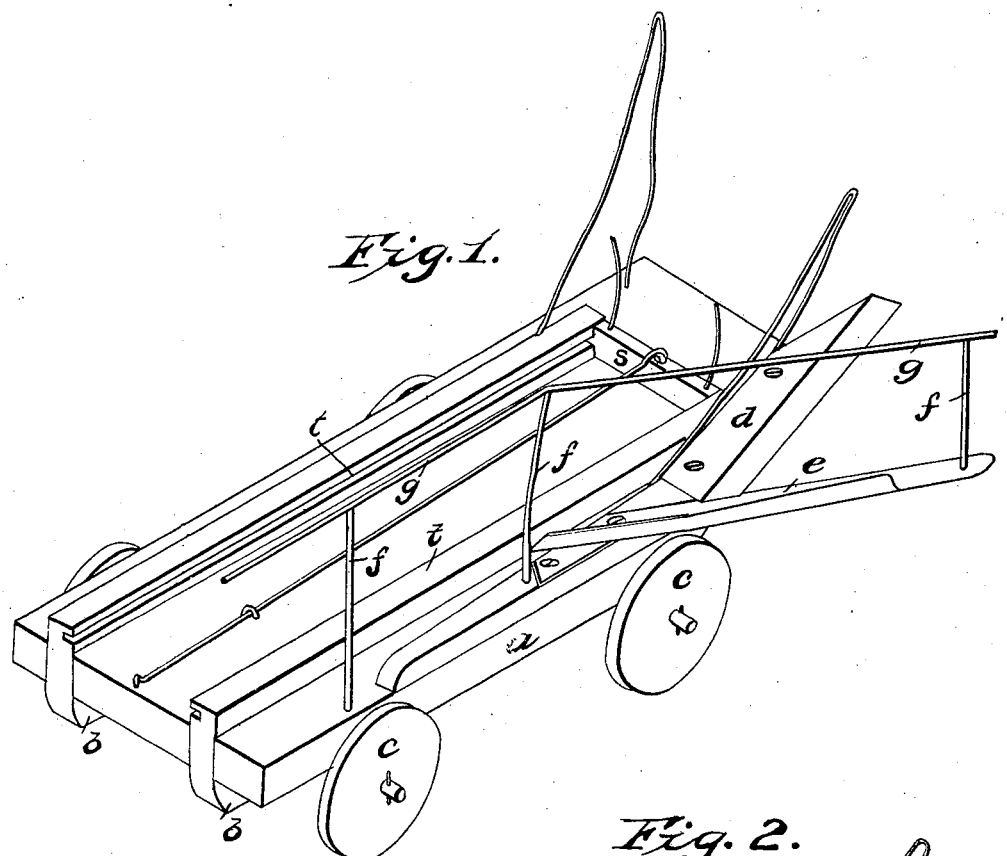
Figure 2:
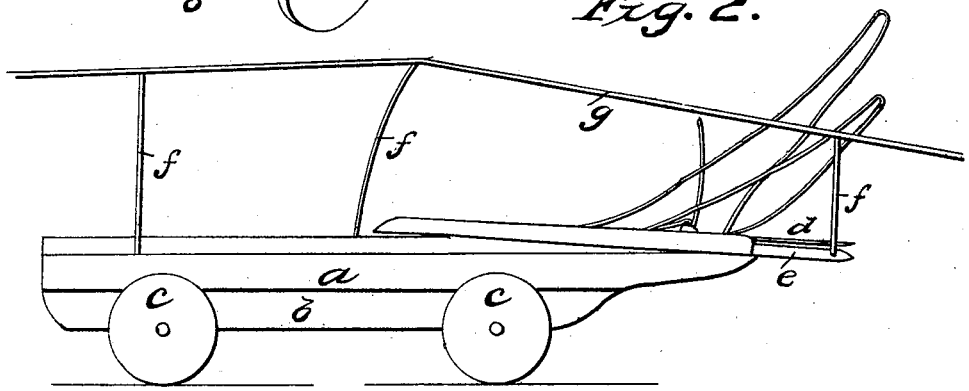

Figure 1 is an isometrical view. Fig. 2 is a geometrical elevation.

The nature of my improvement consists in two converging knives, which have their edges elevated, and the heel where they join somewhat higher than the points that project forward.

The construction is as follows: There is an oblong carriage, $a$, having runners $b$, like those of a common sled, under it. These runners rest, ordinarily, on two axles, on which are the wheels $c$, on which the carriage is borne; or, when the knives are required to cut lower down, the wheels and axles are removed, and the carriage is drawn on the runners. The right-hand front corner of the carriage is cut off angularly and chamfered underneath, so that the knife $d$, which is fastened along parallel with it, has its edge which projects slant upward. The point also of the knife is set lower than the heel, at which last point there is another knife, $e$, that diverges therefrom at an angle of about twenty-five degrees, the two forming a letter V. The point of this knife is also depressed, and the edge which is toward the other is elevated similarly. The last-named knife, $e$, that stands out from the side of the carriage, has standards $f$, that extend up from it and incline inward. There are also similar standards along the side of the carriage, behind the knives. Along the top of these there is a rod, $g$. This apparatus is for guiding the corn, &c., onto the carriage and cause it to fall across it. When this machine is drawn along through the grain or corn, it is drawn between the edges of the two knives, which, as they slant upward and are elevated at the heel, cut up through the stalk, as will be perceived. On the platform of the carriage there is a rake, $s$, that slides back and forth in grooves $t$, moved by hand. The handle of this rake is jointed to the upper side of the head, so that when the rake is pushed forward the teeth lie down, and when it is drawn back the teeth rise and draw back the grain or other substance which is cut.

Having thus fully described my improvements and their operation, I wish it to be understood that I do not claim the diverging knives as they have been used; nor do I claim attaching oblique knives to a carriage for the same reason; but

What I do claim as my invention, and desire to secure by Letters Patent, is—

The diverging knives fastened to a carriage in the manner described, with their points depressed and their edges elevated, substantially in the manner and for the purposes herein set forth.

EDWIN OWEN.

Witnesses:
J. H. GODDARD,
THOS. GREEN.